Patented June 2, 1942

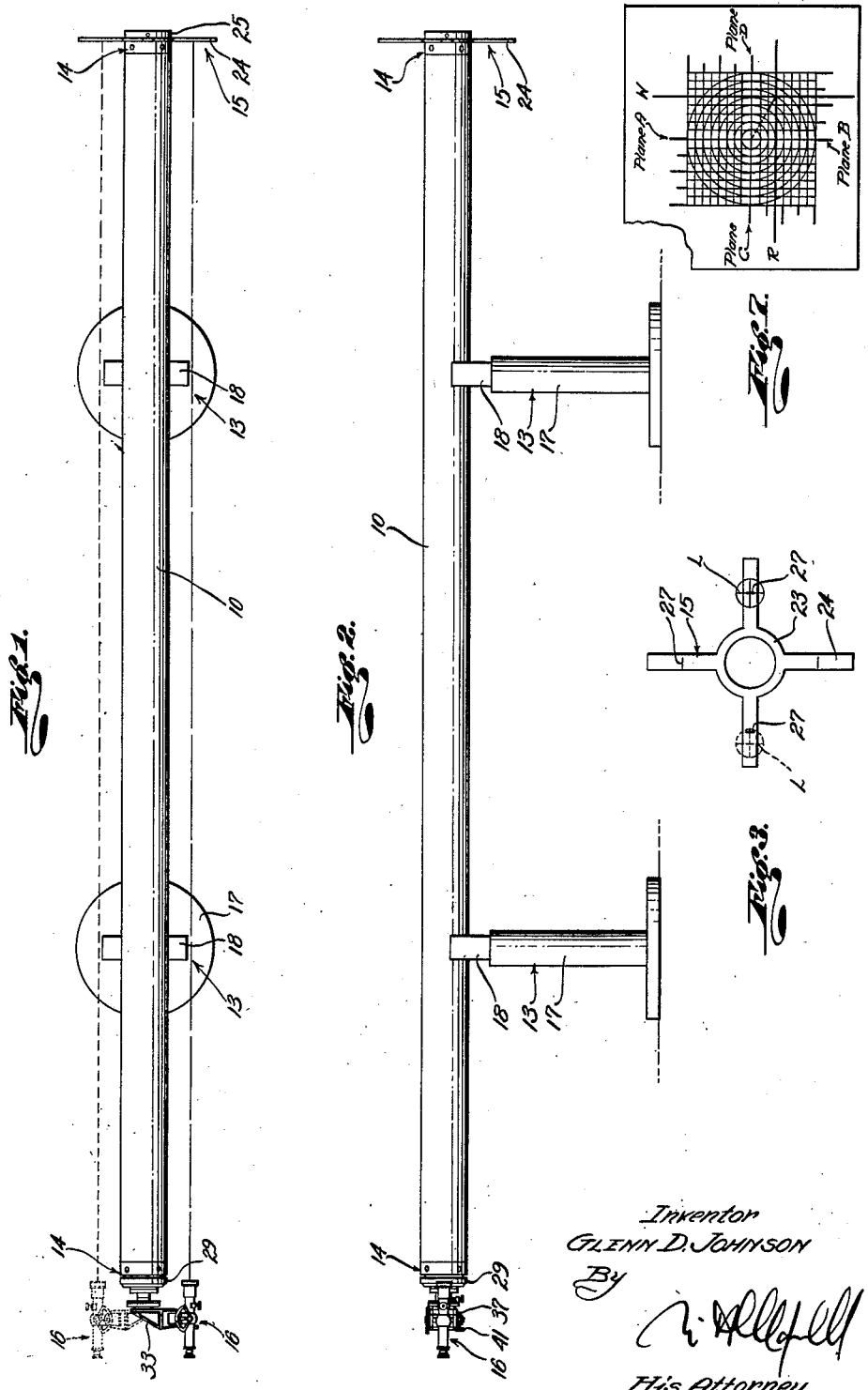

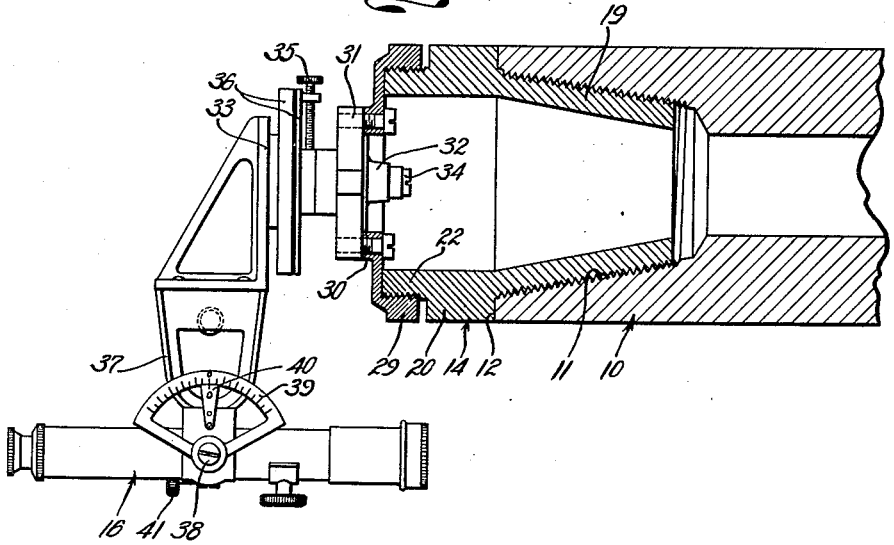
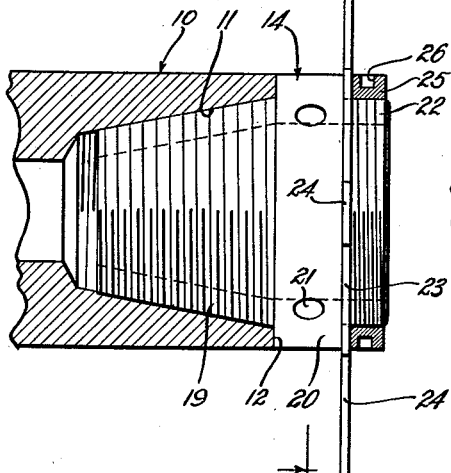
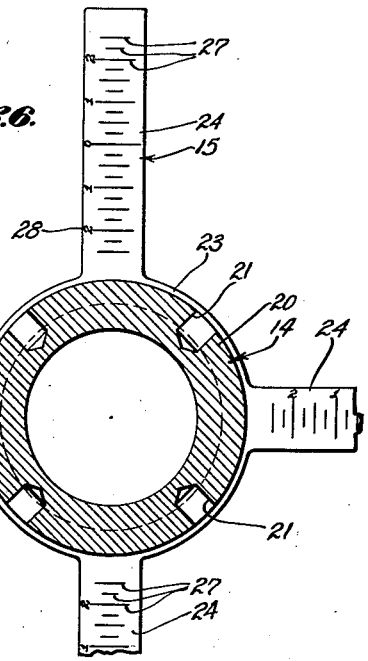

2,285,281

UNITED STATES PATENT OFFICE 2,285,281

APPARATUS FOR SURVEYING ARTICLES OF MANUFACTURE

Glenn D. Johnson, Compton, Calif., assignor to Baash-Ross Tool Company, Los Angeles, Calif., a corporation of California Application April 12, 1940, Serial No. 329,314

6 Claims. (Cl. 33—46)

This invention relates to apparatus for surveying objects and relates more particularly to apparatus for determining the degree of accuracy of alignment of parts of manufactured articles. A general object of this invention is to provide simple, effective apparatus for determining the alignment or the extent of misalignment of parts of manufactured objects, such as the drill stems, drill collars, drill pipe sections, etc., making up a rotary well drilling string.

It is often desirable or necessary to ascertain the exact shape of manufactured objects or to determine the accuracy with which such objects have been formed. For example, it is desirable to determine the accuracy of alignment of the joint portions of the drill stems, kellies and drill pipe sections employed in well drilling strings. It is now the general practice to rotate rotary well drilling strings at a high rate so that the strings are highly stressed and any substantial inaccuracy in the alignment of the joint portions of such a string may result in the failure of the string. For this reason it is now necessary to accurately check the alignment of the joint portions of the equipment making up such a drilling string. I will hereindescribe the invention employed to check the alignment of the joint portions of a member of a rotary well drilling string, it being understood that this is merely a typical application or use and is not to be construed as limiting or restrictive.

Another object of this invention is to provide an efficient apparatus for determining the accuracy of alignment of the joint parts of a drill collar, kelly, length of drill pipe, or similar object or assembly to be used in a rotary well drilling string.

Another object of this invention is to provide an apparatus of the character referred to in which the finished or machined joint parts of the article are directly employed as bases for the determination of their alignment, thus avoiding error that might otherwise result from the engagement of surface irregularities on other parts of the article.

Another object of this invention is to provide an apparatus of the character referred to in which gravitational sag or distortion of the object does not affect or interfere with the determination of the alignment of the joint portions at the ends of the object.

Another object of the invention is to provide an apparatus for checking or determining the accuracy of alignment of the joint portions of a kelly, drill stem, or other elongate object that is easily and quickly applied directly to said joint portions of the object.

Another object of this invention is to provide a surveying apparatus of the character referred to that is easy to use and that may be employed without special training or skill.

A further object of this invention is to provide a surveying apparatus of the character mentioned that is adapted for use on articles varying greatly in length and diameter and that provides for the accurate determination of the alignment or misalignment of the joint parts of such objects.

The various objects and features of my invention will be fully understood from the following detailed description of a typical, preferred form and application of the apparatus, throughout which description reference is made to the accompanying drawings, in which:

Fig. 1 is a plan view of the apparatus of the invention arranged on an elongate object in position for the first operation or sight and showing in broken lines the position of the telescope for the second sight. Fig. 2 is a side view of the equipment shown in Fig. 1. Fig. 3 is an end or face view of the target removed from the adapter with the cross lines of the telescope projected upon one arm of the target and broken lines showing the cross lines of the telescope projected on the opposite arm of the target. Fig. 4 is an enlarged fragmentary longitudinal detailed sectional view showing the telescope and its mounting structure in plan view. Fig. 5 is an enlarged fragmentary longitudinal detailed sectional view of the other end of the object showing the adapter and the target in elevation. Fig. 6 is a fragmentary vertical detailed sectional view taken as indicated by line 6—6 on Fig. 5 and Fig. 7 is a view of a chart that may be employed to record the extent and direction of misalignment of a joint portion of the object.

The apparatus of the invention is useful in determining the alignment of portions of objects or assemblies of various kinds and sizes. In the drawings I have shown the apparatus used on a drill collar of the type employed in rotary well drilling strings. The drill collar or object 10 is an elongate tubular member that is substantially uniform in external diameter. The opposite end portions of the object 10 are formed for ready connection with other parts of the drilling string. In the particular case illustrated the opposite ends of the drill collar or object 10 have tapered screw threaded sockets 11 and the opposite end surfaces 12 of the drill collar are flat and normal to its longitudinal axis.

The apparatus of the invention may be said to comprise, generally, means 13 for supporting the work or object 10, adapters 14 for application to the opposite ends of the object 10, a target 15 carried by one of the adapters 14 and a surveying instrument or telescope 16 turnably and adjustably carried by the other adapter 14.

The means 13 for supporting the work or object 10 is preferably such that the object is supported in a substantially horizontal position for easy turning about its longitudinal axis. In accordance with the broader aspects of the invention the work supporting means 13 may be varied greatly. In the case illustrated the means 13 comprises two work holders 17 arranged on the floor or other support and provided at their upper ends with suitable forks or yokes 18 for the object 10. The work holders 17 are spaced apart to support the object 10 at longitudinally spaced points. With the object 10 supported as illustrated in Figs. 1 and 2 of the drawings there is a minimum of sag or distortion. The cradles or yokes 18 of the work holders 17 are preferably such that the sides, as well as the top of the object 10 are free and unobstructed.

The adapters 14 are provided to support the target 15 and the telescope 16 on the opposite ends of the object 10 in a given or definite relation to the object. The adapters 14 are formed for ready attachment to the finished or joint end portions of the object 10 and, of course, may be varied in size and shape, for use on articles of different types and kinds and for attachment to joint portions of different forms. In the case illustrated where the object 10 has tapered sockets 11 in its opposite ends the adapters 14 have tapered screw threaded pins 19 to be threaded in the sockets 11. Annular enlargements or flanges 20 are formed at the outer ends of the pins 19 and are adapted to engage against the end faces 12 of the object 10. The flanges 20 may be provided with spaced radial sockets 21 for the reception of rods or other tools for turning or threading the adapters. The outer ends of the adapters 14 are formed for the reception of the target 15 and the supporting means of the telescope 16. In the preferred arrangement the outer portions of the two adapters 14 are similar and have reduced externally threaded parts 22. The adapters 14 may be tubular as illustrated, to reduce their cost and weight.

The target 15 is removably arranged on one of the adapters 14 to be in co-axial relation with the longitudinal axis of the adapter and the joint portion or end portion of the object 10 to which the adapter is secured. In the preferred construction the target 15 includes a ring 23 and arms 24 radiating from the ring. The ring 23 is adapted to be arranged on the reduced part 22 of the adapter 14. The ring 23 may be passed over the reduced part 22 to bear against the end face of the flange 20 and to be concentrically supported on the adapter. A sleeve or nut 25 is threaded on the reduced part 22 to clamp against and retain the target ring 23. The nut 25 may be provided with sockets 26 to facilitate its turning or threading.

The target arms 24 are equally spaced about the axis of the ring 23 and there are four like arms 24 spaced substantially 90° apart. The longitudinal axis of the arms 24 are radial relative to the longitudinal axis of the adapter 14 and the joint portion of the object 10 carrying the adapter. The sides of the target arms 24 facing the body of the object 10 are calibrated. Each arm 24 has a series of spaced marks 27 designating inches and fractions of inches, or other linear units, and their fractions. The marks 27 are provided with designating characters or numerals 28. In the preferred construction the intermediate long inch mark 27 is designated zero and the long marks 27 at each side of the zero mark are designated 1—2 in that order. It is to be understood that the corresponding marks of the several arms 24 are corresponding distances from the longitudinal axis of the adapter 14 and the joint part of the object 10 carrying the adapter.

The sighting device or telescope 16 is mounted on one of the adapters 14 to sight the target 15 mounted at the other end of the object 10. The character or form of telescope employed may be varied without departing from the invention and the present invention is not primarily concerned with the details of the optical system or other parts of the telescope, and these details have been omitted from the present disclosure. The invention provides means for mounting the telescope 16 to turn about the longitudinal axis of its supporting adapter 14 and to pivot about an axis transverse of and spaced from the said longitudinal axis. The means for mounting the telescope 16 on its adapter 14 may comprise a mounting body or cap 29 removably threaded on the reduced part 22 of the adapter. The end of the cap 29 has a central opening and a raised boss 30. A plate 31 is secured to the cap 29 by bolts, or the like, to bear on the boss 30 and carries a tubular central bearing 32. An angular bracket 33 is arranged in front of the plate 31 and has a shaft 34 extending through and rotatably carried by the bearing 32. The bracket 33 supported by its shaft 34 may be rotated or turned about the longitudinal axis of the adapter 14. Suitable means is provided for holding the bracket 33 against turning. In practice this means may comprise a set screw 35 carried by the bearing 32 for locking the shaft 34 and the bracket 33 against turning. The set screw 35 is releasable to allow free turning of the bracket. Calibrated flanges 36 may be provided on the bearing 32 and the bracket 33 to indicate the rotative position of the bracket.

The bracket 33 carries an outwardly or laterally facing yoke 37. Shafts or pins 38 mount the telescope 16 in the yoke 37 to pivot about an axis offset from the transverse of the axis of turning of the bracket 33. A calibrated quadrant 39 and stationary marker 40 may indicate the adjusted position of the telescope 16. Clamp means controlled by a set screw 41 is provided to releasably hold the telescope 16 in its adjusted position in the yoke 37.

Assuming that the longitudinal axis of the telescope 16 intersects the axis of adjustment of the telescope the said axis of adjustment is spaced from the longitudinal axis of the object 10 the same distance as the zero marks 28 of the target 15. It will be seen that the telescope 16 mounted as just described may be bodily swung or moved about the longitudinal axis of the supporting adapter 14 and may be pivoted about an axis transverse of and spaced laterally from the longitudinal axis of the adapter. Further, it will be seen that with an arm 24 of the target 15 and the telescope 16 in the same rotative position that the zero mark 28 of the target arm and the longitudinal axis of the target 16 may be in the same plane or on the same axis, assuming that the joint parts or end parts of the object 10 are aligned.

The operation of the apparatus may be said to comprise the following general steps or operations: The mounting of the target 15 and the telescope 16 on the joint portions of the object 10; the adjustment of the telescope 16 to obtain a given relationship between the telescope and an arm 24 of the target; securing the telescope 16 against movement about its transverse axis of adjustment; moving the telescope 16 180° about the longitudinal axis of the object 10; sighting the aligned arm 24 of the target 15 and noting the difference, if any, between this reading and the said given relationship; turning the object 10 90°; repeating the above operations; and then relating the two readings to determine the extent and direction of eccentricity and angularity of a joint portion of the object relative to the main longitudinal axis of the object. The target 15 and the surveying instrument or telescope 16 are interchanged or reversed in position and the operations mentioned above are repeated to check the alignment of the joint portion at the other end of the object 10 and the results of these operations, taken with the results of the former operations, give the extent and direction of misalignment of the two joint portions of the object 10.

With the object 10 supported as illustrated in Figs. 1 and 2, the adapters 14 are readily applied to the joint end portions of the object. The target 15 and the surveying instrument 16 are then or previously secured to their respective adapters 14. The target 15 is adjusted so that it has two arms in substantially horizontal positions and the telescope bracket 33 is adjusted to bring the telescope 16 to a horizontal position at a side of the object 10 to face a horizontal arm 24 of the target. If desired, levels may be employed to bring the target arms 24 and the telescope 16 to true horizontal positions and the telescope is held in the correct position by means of the set screw 35. Following the adjustment or setting of the target 15 and the telescope 16 the operator sights through the telescope and adjusts the telescope to bring its vertical cross hair or cross line L into register with the zero mark 27 of the aligned target arm 24 (see Fig. 3). The adjustment or setting of the telescope 16 may be noted on the quadrant 39 or preferably the telescope 16 may be secured against movement by the set screw 41 to maintain its position where its vertical cross line is aligned with the zero calibration 27 of the target arm.

The set screw 35 is then released or backed off and the bracket 33 is swung 180° to a position at the other side of the object 10 such as indicated by the broken lines in Fig. 1. If desired a level may be employed to bring the telescope 16 to a truly horizontal position so that it lies in the same horizontal plane as the aligned arm 24 of the target 15. The set screw 35 may be employed to lock or set the telescope bracket 33 in place. The operator then sights the target 15 through the telescope 16 and the distance from the vertical hair line L of the telescope to the zero mark 27 and the position of the vertical hair line with respect to the zero mark are observed. One-half of the distance from the vertical hair line L of the telescope to the zero mark 27 represents the misalignment, in one plane, of the joint portion carrying the telescope 16 relative to the longitudinal axis of the object.

In recording the results of the surveying operation and in determining the direction of the misalignment of the joint portion, it is preferred to employ a chart of the kind shown in Figure 7 in which point O represents the longitudinal axis of the object 10. Horizontal line COD of the target 7 represents the diametrical plane of the object 10 in which the joint alignment is determined by operations peformed in the first setting of the object. Vertical line AOB of the target, Figure 7, represents the diametrical plane of the object 10 in which the joint alignment is determined by operations performed in the second setting of the object. Let it be assumed that the vertical hair line L of the telescope, with the telescope in the second position, indicated by broken lines in Figure 1, falls on the 1¼" mark 27 at the right hand side of the 0 mark on scale arm 24. The misalignment would then be ⅝" and would be noted on the chart, or record, as line W.

Following the above operations the drill collar or object 10 is turned approximately 90° in a clockwise direction viewing the end of the object carrying the telescope 16. The bracket 33 is then turned to bring the telescope 16 to a position such as indicated in full lines in Fig. 1 whereupon the set screw 35 is tightened to lock the telescope in place. With the telescope in this position it is adjusted on its pins 38 to bring the vertical hair line L into registration with the zero mark 27 on the aligned target arm 24. With the telescope 16 adjusted the set screw 41 may be tightened to lock the telescope in place. Following this the set screw 35 is backed off and the bracket 33 is turned approximately 180° to bring the telescope 16 to a horizontal position at the opposite side of the object 10 as represented by the broken lines in Fig. 1. The set screw 35 may be employed to lock the telescope in position. At this time the telescope 16 remains locked in its adjusted position by the set screw 41.

The operator then sights the aligned target arm 24 and observes the position of the vertical hair line L of the telescope on the arm. On the chart or data sheet shown in Fig. 7 the plane OA is the plane occupied by the telescope 16 when its vertical hair line L is brought into registration with the zero mark of the target 15 and the plane OB is the plane occupied by the telescope when the secondary or last reading is taken. Assuming that the distance from the vertical hair line of the telescope 16 to the zero mark 27 is ¾ of an inch and that the hair line is at the left of the zero mark with the telescope in plane OB, the misalignment would be ⅜ of an inch and is recorded on the data sheet as the line R. The intersection of the line W and the line R indicates the misalignment of the joint portion of the object 10 carrying the telescope 16 with respect to the axis 0.

The chart or data sheet shown in Fig. 7 is divided into quadrants by the plane lines A, B, C and D so that the intersecting lines R and W indicate not only the extent of misalignment but the direction of misalignment of the joint portion of the object 10. In the case above described the misalignment is recorded in the sector defined by the planes OB and OD. The distance from the point 0 to the point of intersection of the lines R and W represents the total misalignment. If the object 10 is 40 feet long the misalignment in the above example would be ¾ of an inch in the 40 feet or ⅜ of an inch in 20 feet. By computation this can be converted into a product representative of the angle of misalignment which, in the typical case above described, would be 0° 5′ 23″. In calculating the misalignment and the angle of misalignment the following may be used:

$$\text{Misalignment in 20 feet} = \frac{240d}{D}$$

$$\text{Angle of misalignment} = \tan^{-1}\frac{d}{D}$$

where

D = distance from the target to joint face in inches d = distance from projected axis of joint to intersection of plane lines on target in inches.

To determine the misalignment of the other joint portion of the object 10 the positions of the target 15 and the telescope 16 are reversed, that is, the telescope 16 is arranged in the position formerly occupied by the target 15 and the target is supported on the joint portion of the object 10 whose alignment has been checked. It is to be understood that the target 15 and the telescope 16 are mounted on the end part of the object 10 by their adapters 14. The above operations are then repeated and the results may be recorded all as above described, to determine and record the misalignment of the said other end portion of the object 10. If desired the information obtained by the above operations may be marked upon the product or object 10. This may be done by making a line on each end portion of the object 10 representative of the plane of the maximum misalignment of the respective joints and corresponding extension of the misalignment may be marked at the plane lines.

It is to be particularly noted that the surveying operations performed by the telescope 16 are carried out in horizontal planes at the opposite sides of the horizontally disposed object 10 so that distortion or sag of the object by reason of its great length has no effect upon the results of the operations. The sag or distortion of the elongate object 10 occur in a vertical plane and have no influence upon the surveying operations. The tests or observations are made in pairs of planes or positions at right angles to one another to provide for the structural misalignment of the joint parts in both vertical and horizontal planes, but the actual surveying operations are performed in horizontal planes where the vertical sag or distortion of the object cannot affect the results.

Having described only a typical preferred form of apparatus, I do not wish to be limited or restricted to the specific details herein set forth, but wish to reserve to myself any variations or modifications that may appear to those skilled in the art or fall within the scope of the following claims:

Having described my invention, I claim:

1. Apparatus for surveying an object having threaded joint portions at its ends comprising adapters to be removably threaded with said joint portions to assume given positions on the same, a target carried by one adapter to project radially from the same, a telescope, and means supporting the telescope on the other adapter for turning movement about the longitudinal axis of the object, and for pivotal adjustment about an axis transverse of and spaced from the longitudinal axis of the object.

2. Apparatus for surveying an object having threaded joint portions at its ends comprising adapters to be removably threaded with said joint portions, a target carried by one adapter to project radially from the same, a telescope, means mounting the telescope on the other adapter for turning movement about the longitudinal axis of the adjacent joint portion and for adjustment about an axis transverse of and spaced from said longitudinal axis, and means for releasably locking the telescope against movement about said transverse axis.

3. Apparatus for surveying an object having threaded joint portions at its ends comprising adapters to be removably threaded with said joint portions, a target carried by one adapter to project radially from the same, a telescope, a bracket, means supporting the bracket on the other adapter for turning about the longitudinal axis of the adapter, releasable means for holding the bracket against turning, and means mounting the telescope on the bracket for pivotal adjustment about an axis spaced from and transverse of said longitudinal axis.

4. Apparatus for surveying an object having finished joint portions at its ends comprising adapters for application to said portions to assume given positions on the same, a target on one adapter including circumferentially spaced radiating arms having spaced calibrations, and a telescope supported on the other adapter for movement about the longitudinal axis of the object and for adjustment about an axis spaced from and transverse of said longitudinal axis.

5. Apparatus for surveying an object having threaded joint portions at its ends comprising adapters to be removably threaded with said joint portions, a target carried by one adapter to project radially therefrom, a telescope, a bracket for the telescope, a plate removably threaded on the adapter and carrying the bracket for turning movement about the longitudinal axis of the adapter, and means supporting the telescope on the bracket for pivotal adjustment about an axis offset from and transverse of said longitudinal axis.

6. Apparatus for surveying an object having finished joint portions at its ends comprising an adaptor for application to either one of said joint portions, a target adapted to be arranged on the object, a telescope for sighting the target, and means for supporting the telescope on the adapter for movement about the longitudinal axis of the joint portion which carries the adaptor and for adjustment about an axis spaced from and transverse of said longitudinal axis.

GLENN D. JOHNSON.